(12) United States Patent
Tomikawa et al.

(10) Patent No.: US 9,217,193 B2
(45) Date of Patent: Dec. 22, 2015

(54) ALUMINUM ALLOY FOR PLAIN BEARING, PLAIN BEARING AND PRODUCTION METHOD FOR THE BEARING

(75) Inventors: Takashi Tomikawa, Toyota (JP); Shinichiro Sakamoto, Toyota (JP); Katsumi Yamamoto, Toyota (JP)

(73) Assignee: TAIHO KOGYO CO., LTD., Toyota-shi (JP)

( * ) Notice: Subject to any disclaimer, the term of this patent is extended or adjusted under 35 U.S.C. 154(b) by 729 days.

(21) Appl. No.: 13/519,221

(22) PCT Filed: Dec. 22, 2010

(86) PCT No.: PCT/JP2010/073194
§ 371 (c)(1),
(2), (4) Date: Oct. 9, 2012

(87) PCT Pub. No.: WO2011/078255
PCT Pub. Date: Jun. 30, 2011

(65) Prior Publication Data
US 2013/0022301 A1   Jan. 24, 2013

(30) Foreign Application Priority Data
Dec. 26, 2009   (JP) .................................. 2009-296465

(51) Int. Cl.
*F16C 33/12* (2006.01)
*C22F 1/047* (2006.01)
(Continued)

(52) U.S. Cl.
CPC .............. *C22C 21/06* (2013.01); *B05D 3/0254* (2013.01); *B05D 3/04* (2013.01); *B32B 15/04* (2013.01);
(Continued)

(58) Field of Classification Search
CPC ........ C22C 21/00; C22C 21/06; C22C 21/08; B32B 15/012; B32B 15/04; B32B 15/08; B32B 15/088; B32B 15/18; B32B 15/20; B32B 2475/00; C23C 28/00; C23C 28/322; C23C 28/324; C23C 28/34; Y10T 428/12569; Y10T 428/12736; Y10T 428/12757
USPC .......................... 428/650, 653, 626; 420/545
See application file for complete search history.

(56) References Cited

U.S. PATENT DOCUMENTS 5,384,205 A   1/1995   Tanaka et al.
5,846,347 A   12/1998  Tanaka et al.
(Continued)

FOREIGN PATENT DOCUMENTS

JP   51-4926 B    2/1976
JP   63-50442 A   3/1988
(Continued)

OTHER PUBLICATIONS

Machine Translation, Desaki Toru, JP 2000-017363, Jan. 2000.*
(Continued)

*Primary Examiner* — Michael E La Villa
(74) *Attorney, Agent, or Firm* — Westerman, Hattori, Daniels & Adrian, LLP

(57) ABSTRACT

With regard to an Al—Cr—Zr based alloy having annealing temper, a high temperature strength at 180 to 200 degrees C. is ensured. An aluminum alloy for a plain bearing having improved fatigue resistance is to be provided. An aluminum alloy for a plain bearing solving the problems has a composition of 3 to 7 mass % Mg, 0.1 to 0.3 mass % Cr, and 0.1 to 0.3 mass % Zr, with the balance being Al and inevitable impurities. A principal structure of the aluminum alloy consist of an Al matrix containing solute Mg, minute particles of Cr, and Zr.

16 Claims, 4 Drawing Sheets

(51) Int. Cl.
- *B05D 3/00* (2006.01)
- *C22C 21/06* (2006.01)
- *B32B 15/04* (2006.01)
- *C23C 28/00* (2006.01)
- *C22C 21/00* (2006.01)
- *C22C 21/08* (2006.01)
- *B32B 15/08* (2006.01)
- *B32B 15/088* (2006.01)
- *B32B 15/18* (2006.01)
- *B32B 15/20* (2006.01)
- *B05D 3/04* (2006.01)
- *B05D 3/02* (2006.01)
- *F16C 33/14* (2006.01)
- *F16C 33/10* (2006.01)

(52) U.S. Cl.
CPC ............... *B32B 15/08* (2013.01); *B32B 15/088* (2013.01); *B32B 15/18* (2013.01); *B32B 15/20* (2013.01); *C22C 21/08* (2013.01); *C22F 1/047* (2013.01); *C23C 28/30* (2013.01); *C23C 28/322* (2013.01); *C23C 28/324* (2013.01); *C23C 28/34* (2013.01); *F16C 33/1095* (2013.01); *F16C 33/121* (2013.01); *F16C 33/14* (2013.01); *F16C 2204/20* (2013.01); *Y10T 428/12569* (2015.01); *Y10T 428/12736* (2015.01); *Y10T 428/12757* (2015.01)

(56) References Cited

U.S. PATENT DOCUMENTS

| | | |
|---|---|---|
| 2002/0068189 A1 | 6/2002 | Kagohara et al. |
| 2007/0082825 A1 | 4/2007 | Kawakami et al. |

FOREIGN PATENT DOCUMENTS

| | | |
|---|---|---|
| JP | 05-332364 A | 12/1993 |
| JP | 06-136475 A | 5/1994 |
| JP | 3868630 B2 | 1/2007 |
| JP | 2007-107589 A | 4/2007 |
| JP | 3958515 B2 | 8/2007 |
| JP | 2010-077506 A | 4/2010 |

OTHER PUBLICATIONS

JIS G 3141:2005 "Cold reduced carbon steel sheets and strips," 2005 (no month) (28 pages).*
International Search Report for PCT/JP2010/073194 on mailing date Mar. 22, 2011.
International Preliminary Report on Patentability of PCT/JP2010/073194, date of issuance Aug. 14, 2012.
Written Opinion of the International Searching Authority of PCT/JP2010/073194, mailing date of Aug. 14, 2012.

* cited by examiner

ALUMINUM ALLOY FOR PLAIN BEARING, PLAIN BEARING AND PRODUCTION METHOD FOR THE BEARING

TECHNICAL FIELD

The present invention relates to aluminum alloy for plain bearing, a plain bearing and a production method for the alloy. More particularly, in the present invention, a temper and dimension of an Al—Mg—Cr—Zr based aluminum-alloy rolled sheet are regulated during the forming process and heat treatment so that they are appropriate for a plain bearing.

Rolled sheets of the following aluminum alloys are standardized materials for producing a plain bearing.

SAE 780: 7.0% Sn—1.0% Cu—1.6% Ni—0.6% Si—1.0% Mg

SAE 781: 6.25% Sn—1.0% Cu—0.5% Ni—1.5% Si

Recently, internal combustion engines of automobiles have become small-sized and are operated highly efficiently. Under such trend, the width of a plain bearing has become narrowed and load applied on plain bearings has increased. In addition, since the viscosity of lubricating oil has lowered, the thickness of lubricating oil film has become so thin that a shaft and a bearing are frequently brought into contact with each other. As a result, the temperature of the bearing surface rises. Under such circumstances, aluminum alloys suitable for manufacturing a plain bearing are being developed.

BACKGROUND TECHNIQUE

The present applicant previously proposed in Patent Document 1, Japanese Patent No. 3868630 "an aluminum alloy for a plain bearing having improved fatigue resistance under high surface pressure, characterized in that: it contains 1 to 15% by weight of Sn, 1 to 8% by weight of Si, 0.05 to 0.3% by weight of Cr, and 0.05 to 0.3% by weight of Zr, the balance being Al and unavoidable impurities; it has a annealing temper, namely, a post-rolling annealing comprising a low-temperature annealing at 300 to 400 degrees C. and a high-temperature annealing at 400 to 480 degrees C., with the temperature difference between the low- and high-annealing treatments being 10 degrees C. or more: an Al—Cr intermetallic compound precipitates mainly in the grain boundaries of aluminum, and Al—Zr intermetallic compound precipitates mainly in sub-grains within the crystal grains of the aluminum" (claim 1). In Patent Document 1, the intended use of the aluminum alloy is a plain bearing operated under high surface temperature condition. For this purpose, the structure of the alloy is controlled to have precipitates of the Al—Cr and Al—Zr intermetallic compounds, which contribute to enhancing the fatigue resistance at high temperature. In addition, hard particles formed of Si effectively prevent seizure. Furthermore, Pb and Sn added as optional components also enhance seizure resistance.

In Patent Document 2: Japanese Unexamined Patent Publication (kokai) No. 2007-107589, a resin-based coating layer consisting of a solid lubricant and a resin binder is bonded to aluminum alloy, and cavitation resistance of the coating is improved by means of enhancing bonding strength between the coating layer and aluminum alloy. For this purpose, the Sn content of the aluminum alloy is set in the range of 0 to 2 mass %. The aluminum alloy further contains 0.1 to 20 mass % in total of Si, Cu, Ni, Cr, Zn, Mn, Ti, B, Zr, Mg, V, Pb and/or Bi. Among these elements, the elements other than Si, Pb and Bi (hereinafter referred to as "the elements Si and the like") are dissolved in the aluminum matrix or form intermetallic compounds with Al to precipitate, according to the descriptions of Patent Document 2. In the Examples, the additive elements are Sn, Cu, Si, Zn, Pb and Mn but not Mg.

The production method disclosed in Patent Document 2 is as follows. An aluminum-alloy cast material is rolled to form an aluminum-alloy sheet, and this sheet is bonded to a steel sheet (backing metal) by means of roll bonding to form a bimetal. Through this process, the elements Si and the like are either dissolved in or caused to precipitate in the aluminum alloy. However, the solution and precipitating conditions are not specifically described. The bimetal is press-worked to have a hemi-cylindrical shape and is then machined to predetermined shapes of parts of interest. A resin coating layer is then provided thereon and baked at 230 to 250 degrees C. for 1 hour in Patent Document 2.

Patent Document 3: Japanese Patent No. 3958515 relates to a multi-layer bearing having a steel backing metal, an aluminum-alloy intermediate layer, and an aluminum-based bearing alloy layer. The aluminum-based bearing alloy layer contains 0.1 to 7 mass % of at least one element selected from Cu, Zn, Mg and Si. The aluminum-based bearing alloy layer, bonded to the steel backing metal, is solution-treated at 400 degrees C. or higher. According to Patent Document 3, the following changes occur during the solution treatment of the aluminum-based bearing alloy layer bonded to the steel backing metal via an intermediate layer. First, such elements as Cu, Zn, Mg and Si of the aluminum based bearing alloy layer are dissolved in the Al matrix and, during subsequent rapid cooling, reinforce the aluminum alloy and hence improve fatigue resistance of a bearing. Incidentally, fatigue resistance is tested at a fed oil temperature of 100 degrees C. An Al—Fe—Si based compound is present in the aluminum-alloy intermediate layer at a side of the backing metal and prevents formation of a brittle Al—Fe based compound. In the Examples, the highest additive amount of Mg in the Al alloy is 1.5%.

Patent Document 3 discloses that the aluminum-based bearing alloy may further contain the elements given below. It is understood that these elements are dissolved in the Al matrix by solution treatment at 400 degrees C. or higher. Alternatively, the aluminum alloy may be subjected to solution treatment and then artificial aging.

(1) 3 to 20 mass % of Sn
(2) 0.1 to 7 mass % in total of one or more elements selected from Cu, Zn, Mg and Si
(3) 0.01 to 3 mass % in total of one or more elements selected from Mn, V, Mo, Cr, Co, Fe, Ni and W
(4) 0.01 to 2 mass % in total of one or more elements selected from B, Ti and Zr
(5) 3 mass % or less in total of one or more elements selected from Pb, Bi and In Patent Document 4, Japanese Unexamined Patent Publication (kokai) No. 2010-77506 corresponds to a patent application filed earlier than the present application but has not yet been published as of the priority dale of the present application. Patent Document 4 relates to an aluminum alloy for forming an outer panel or the like of the body of an automobile. The aluminum alloy contains 1.5 to 7.0 mass % of Mg, and also contains such elements as Fe, Si, Mn, Cr, Zr, V and Ti as optional components. When Cr and Zr are selected front among them, each of the Cr and Zr contents is 0.3 mass % or less. The production method of an aluminum-alloy rolled sheet described in Patent Document 4 is as follows: homogenizing an ingot; hot rolling (thickness 3.5 mm); cold rolling accompanied with intermediate annealing (thickness 1 mm);

solution treatment: and skin pass rolling. Finally, tempering (50-80 degrees C.) is occasionally carried out.

PRIOR ART DOCUMENTS

Patent Documents

Patent Document 1: Japanese Patent No. 3808630
Patent Document 2: Japanese Unexamined Patent Publication (kokai) No. 2007-107589)
Patent Document 3: Japanese Patent No. 3958515
Patent Document 4, Japanese Unexamined Patent Publication (kokai) No. 2010-77506

SUMMARY OF INVENTION

Problems to be Solved by Invention

Patent Document 1 considers that the surface temperature of a plain bearing made of an aluminum-based plain-bearing material elevates up to 180 degrees C. (Paragraph 0004). High-temperature strength is ensured through adding the transition elements such as Cr and Zr, forming intermetallic compounds with Al, and precipitating them. However, when the surface temperature of a bearing arrives at 180-200 degrees C., insufficient strength failure may result in fatigue. Patent Document 1 describes a state of the temper of aluminum alloy for a plain bearing, which is referred in the following paragraph.

The $T_4$ or $T_6$ tempered aluminum alloy having the same composition as that of the present invention has a tensile strength of approximately 300 MPa. The aluminum alloy according to the present invention is not heat treated as above, and has therefore a tensile strength as low as a half or less that of $T_4$ or $T_6$ tempered alloy. The temper having such strength can be obtained when stress relief is further performed to an extent of over-aging. This state is referred to as the annealing temper in the present invention and is specifically attained, subsequent to rolling, by means of low-temperature annealing at 300 to 400 degrees C., preferably 320 to 380 degrees C. and high-temperature annealing at 400 to 480 degrees C., preferably 420 to 480 degrees C., with a proviso that temperature difference between the low- and high-temperature annealing is 10 degrees C. or more.

Annealing must be performed under the following conditions: the low-temperature annealing causes precipitation of Al—Cr intermetallic compound; and, the high-temperature annealing causes precipitation of Al—Zr intermetallic compound. If such conditions are not met, some unfavorable phenomena may occur. Namely, coarsening and partial solution of Al—Cr intermetallic compound may occur in high-temperature annealing. Precipitation of Al—Zr intermetallic compound is slight in low-temperature annealing. Separate annealing treatments at low temperature and high temperature must be carried out to avoid the unfavorable points. Preferably, the low-temperature annealing should be followed by the high-temperature annealing. When this preferable sequence is reversed, Al—Cr intermetallic compound partially dissolves during the earlier high-temperature annealing and then slightly precipitates in the later low-temperature annealing. Preferable low-temperature annealing time lies in the range of 30 minutes to 5 hours, while preferable high-temperature annealing time lies in the range of 30 minutes to 5 hours.

Patent Document 1 suggests that the strength of its proposed aluminum alloy tends to be insufficient at 180 to 200 degrees C. In the disclosed aluminum alloy, 1 to 8 mass % of Si is an indispensable component, and 3 mass % or less of Cu, Mg and the like having a wide solubility range are added. Notwithstanding the wide solubility range, when Mg and Si are added together, since eutectic $Mg_2Si$ is formed during casting, the resultant product is of high strength but is brittle and is difficult to work.

Patent Document 2 proposes a coating layer capable of enhancing cavitation resistance. A wide range of aluminum alloy compositions are given as candidates for forming a coating layer thereon. Such a range includes compositions that cannot be actually used for a plain bearing. Baking of resin coating corresponds to a final heat treatment, that is, 230 to 250 degrees C. for 1 hour, which is equivalent to an artificial aging in $T_6$ treatment of aluminum alloy.

Patent Document 3 discloses, in one of its Examples, a bearing alloy having a tensile strength of approximately 180 to 190 MPa. This strength may be insufficient in an environment where load applied to the bearing is high, or where operating temperature reaches 180 to 200 degrees C. Lack of high-temperature strength is believed to be inherent in an alloy of solid-solution type or an alloy of artificial aging type.

Generally speaking, a part of an automobile body made of an aluminum-alloy for forming is overwhelmingly greater than engine metals. Patent Document 4 discloses a mass-producing technique for high Mg aluminum alloys having large width. However, the disclosed technique is not applicable to a small scale production of narrow-width sheets for manufacturing plain bearings. In addition, the Al—Mg based aluminum alloy of Patent Document 4 does not exhibit such a temper that Cr and Zr contained in the Al—Mg enhance performances of a plain bearing. The morphology of such elements as Cr and Zr is not appropriately adjusted by tempering.

As is described hereinabove, high-temperature strength of a plain bearing according to the techniques disclosed in Patent Documents 2 and 3 is insufficient. In other words, the annealing-temper technique, which is provided in Patent Document 1 and cited in Paragraph 0010, above, enhances high-temperature strength of an Al—Zr—Cr based aluminum alloy, which does not arrive at a level required at approximately 180 to 200 degrees C. is not ensured.

It is, therefore, an object of the present invention to provide an aluminum alloy for a plain bearing and a plain bearing having improved high-temperature strength and fatigue resistance.

Generally, an Al—Mg based alloy having high Mg content has low formability and thus should be hot-rolled using an expensive hot-rolling mill or the like. A hot-rolling mill is per-se expensive. A hot-rolling mill is typically provided with a heating furnace and cooling tables for cooling rolled plates. Therefore, plant investment for a hot-rolling mill is enormous. It is, therefore, also an object of the present invention to provide a method for producing a plain bearing from an Al—Mg based alloy having high Mg content, by means of a general production plant of plain bearings, without necessitating new plant investment.

Means for Solving Problems

The aluminum alloy for a plain bearing according to the present invention consisting of an aluminum-alloy rolled sheet is characterized in that: it has a composition containing 3 to 7 mass % Mg, 0.1 to 0.3 mass % Cr, and 0.1 to 0.3 mass % Zr, with the balance being Al and inevitable impurities including Sn, Bi, Si, Pb, Fe, Ti and B: and further a principal structure of said aluminum alloy consists of an Al matrix dissolving therein solute Mg as well as Cr minute particles and Zr minute panicles.

In the plain bearing according to the present invention, the above-mentioned aluminum alloy for a plain bearing is bonded to a backing metal consisting of a low-carbon steel sheet. Preferably, a 2 to 10 μm thick overlay of consisting of a solid lubricant $MoS_2$ and either or both of polyamideimide and polyimide is applied to the surface of a plain bearing to be in contact with an opposite shaft.

The method for producing a plain bearing according to the present invention is characterized in that an aluminum alloy, which has a composition containing 3 to 7 mass % Mg, 0.1 to 0.3 mass % Cr, 0.1 to 0.2 mass % Zr, with the balance being Al and inevitable impurities including Sn, Bi, Si, Pb, Fe, Ti and B, is continuously cast into a sheet having a thickness of 14 to 18 mm: the continuously cast sheet is cold rolled to provide a final thickness of a plain bearing: during the rolling process, the sheet is successively subjected to low-temperature annealing at a temperature of not less than 300 degrees C. and less than 420 degrees C. and to a high-temperature annealing at a temperature of not less than 420 degrees C. and not more than 450 degrees C., with the proviso that the temperature difference between the low- and high-temperature annealing is 10 degrees C. or more; and subsequently, the rolled sheet is pressure-bonded on a backing metal consisting of a low carbon steel sheet.

The present invention is hereinafter described in detail following the sequence of composition and structure of aluminum alloy, plain bearing, and production method.

Composition of Aluminum Alloy

The aluminum alloy used for manufacturing a plain bearing according to the present invention contains Mg completely dissolved in the Al matrix, except for a minor amount of precipitates combined with impurities. Mg enhances the strength of matrix. As a result, high-temperature strength and fatigue resistance of a bearing are improved. Sn, Bi, Pb and Si of the inevitable impurities and Mg are combined with one another and precipitate in the form of compounds. However, such compounds do not contribute to improve characteristics. Incidentally, a large-end bearing of a connecting rod and a main bearing of an automobile's internal combustion engine, and a journal bearing used for general industrial machines are subjected to high load stress. Mg must be added in 3 to 7 mass % so as to impart a strength required for these bearings. When the addition amount of Mg is 3 mass % or less, the obtained strength remains only on a level of prior art techniques. On the other hand, when the addition amount of Mg is 7 mass % or more, the bearing becomes too strengthened to ensure conformability required in the initial running period of bearing. Furthermore, formability of the aluminum alloy is impaired. In addition, as is described hereinbelow, the aluminum alloy according to the present invention is free of Si additive. Improvement in seizure resistance in the present invention is attained by an Mg compound formed on the alloy surface, and not by the Si additive.

Dislocations in the alloy are pinned by Cr, whereby fatigue fracture due to coarsening of crystal grains is suppressed. The addition amount of Cr required for attaining this effect is 0.1 to 0.3 mass %, more preferably 0.1 to 0.2 mass %.

Similar to Cr precipitates, Zr precipitates also exhibit the pinning effect. The addition amount of Zr required for attaining this effect is 0.1 to 0.3 mass %, more preferably 0.1 to 0.2 mass %.

Other than the components mentioned above, the alloy of the present invention contains Al and inevitable impurities mentioned above. In particular, Si, which forms $Mg_2Si$, should be restricted to a level as low as possible. Pb, Sn, Bi and the like form a soft component and reduce the strength. Any of these elements should be restricted to a level as low as possible.

In addition, although added Sn forms with Mg a compound which appreciably enhances strength, since the fundamental strengthening element is solute Mg in the present invention, Sn is treated as an impurity. Typical impurities are less than 0.1% Pb, less than 0.3% Fe, less than 0.1% Sb and less than 0.3% Ti. Other impurities in a smaller trace amount may be present. None of Cu, Ni, Zn, Mn, and V impede solid solution of Mg, and therefore, they may be present to some extent, preferably 1.0 mass % or less in total.

Structure of Aluminum Alloy

The aluminum alloy according to the present invention is hereinafter described from a structural point of view. Mg is almost entirely dissolved in the solid Al matrix of the aluminum alloy according to the present invention. When the aluminum alloy according to the present invention has undergone the annealing process described hereinbelow, uncountable numerous minute Cr and Zr particles are detected in the electron probe micro-analyzed (EPMA) structure of the aluminum matrix, indicating precipitation of Cr and Zr. Precipitation of Cr occurs during a low-temperature annealing, while precipitation of Zr occurs during a high-temperature annealing. Crystal grains and sub-grains are pinned by minute Cr and Zr particles, whereby coarsening is prevented. As a result, fatigue fracture due to grain-coarsening is also prevented. Minutes Cr and Zr particles are herein those that can be observed by a microscope at a certain magnification described hereinbelow or at higher magnifications. The constituent elements that form the principal structure are alloying elements of the aluminum alloy. The other impurity elements participate in formation of such compounds as $Mg_2Si$, Mg—Sn, Al—Fe and the like. They can be detected by X-ray diffraction. The principal structure contributes to enhancing high-temperature strength and fatigue resistance, while the above-mentioned compounds formed by impurities do not contribute to the improvement of these properties. In addition, $Mg_2Si$ and Mg—Sn decrease the amount of solute Mg in the Al matrix, causing reduction of high-temperature strength. Therefore, $Mg_2Si$ and Mg—Sn should be excluded from the principal structure.

Plain Bearing

The above-described aluminum-alloy rolled sheet used for manufacturing a plain bearing according to the present invention takes the form of so-called lining. The lining is pressure-bonded to a backing metal consisting of a low carbon steel preferably having a carbon content of 0.1 to 0.3 mass %. The thus-produced bimetal is shaped into a semi-cylindrical or a cylindrical shape. The plain bearing of the present invention can be operated even when the maximum operating temperature arrives as high as 180 to 200 degrees C. The "maximum operating temperature" herein indicates the surface temperature of a bearing in an engine rotated at a maximum number of revolution. Generally, the strength of an aluminum alloy decreases with temperature. Prior art techniques do not recognize that the maximum operating temperature of an aluminum alloy used for a plain bearing rises to approximately 200 degrees C. Prior art designs alloy strength on an assumption that the surface pressure of a bearing is approximately 40 to 60 MPa. The plain bearing according to the present invention is characterized by maintaining the structure described in the foregoing paragraph "Structure of Aluminum Alloy" at the maximum operating temperature mentioned above. The plain bearing is also characterized in that its strength is very high, so that it can be used under a surface pressure of up to approximately 80 to 100 MPa.

A plain bearing is inevitably brought into contact with an opposite shaft during an initial operating period, which means the surface pressure of the plain bearing is locally high. A mixture of solid lubricant $MoS_2$ and resin in the form of liquid is applied to the surface of aluminum alloy to be in contact with an opposite shaft. The thus-formed layer improves conformability of the plain bearing. As a result, local stress is mitigated and fatigue fracture is lessened. Seizure in the initial running period is effectively prevented as well. Preferably, the resin is a polyamide-imido (PAI), polyimide (PI) and the like. The amount of $MoS_2$ in the coating is preferably 60 to 90 mass %. Solid lubricant graphite may be used in combination with $MoS_2$. Alternatively, graphite may be used alone.

Production Method

The method for producing an aluminum alloy for a plain bearing according to the present invention will next be described. An aluminum alloy having a predetermined composition is continuously cast to form a cast sheet having a thickness of 14 to 18 mm. The added Mg is retained in a dissolved state in the matrix of as-cast aluminum. Also, formation of crystallites during casting is suppressed. Cold rolling is subsequently carried out in multi-stages until a final thickness, that is, the thickness of a lining is obtained. Stress relief annealing is carried out at least once between the cold rolling steps. Low temperature annealing at not less than 400 degrees C. and less than 420 degrees C. and high temperature annealing at not less than 420 degrees C. and not more than 450 degree C carried out. As a result, annealing temper is provided. Difference between the low and high-temperatures of annealing must be at least 10 degrees C. The low- and high-temperature annealing treatments may be carried out as a substitute of stress-relief annealing. A low-temperature annealing and then a high-temperature annealing are carried out. These annealing steps may be carried in an intermediate step between the successive cold rolling steps. Alternatively, a low-temperature annealing, a cold rolling and then a high-temperature annealing can be successively carried out. The high-temperature annealing may be carried as a final heat treatment in the cold rolling process.

Healing up to the annealing temperature is followed by holding the temperature, and then, furnace cooling in an annealing furnace. Noticeable points of the furnace cooling are as follows. (a) Precipitation, which impairs the effects of the Al matrix with Mg solute, does not occur at all during the cooling process. In this regard, elements that may be combined with Mg are maintained to a low level in the present invention. (b) Furnace cooling is not a forcible cooling in which Mg and the like are dissolved in super-saturation. Therefore, even when the coating layer is baked in a final step, the solid solution state of Mg is maintained. The lining produced by the above-described process is placed on a low-carbon steel sheet, following by roll-bonding. A bimetal is thus produced.

Effects of Invention (1) Aluminum alloys having an inventive composition and structure were subjected to a tensile test in a temperature range of from room temperature to 200 degrees C. It was confirmed that the inventive aluminum alloys have higher tensile strength as compared with aluminum alloys falling within a category of Patent Document 1. This reason is considered as follows, Cr, Zr and the like lessen strength reduction in a high temperature region up to 180 degrees C. Mg added in a greater amount and a higher solute amount of Mg in the present invention than in Patent Document 1 lead to an increase in high temperature strength and fatigue resistance under cyclic stress at a high temperature region of 180 degrees C. or higher. Seizure resistance evaluated under a static load was revealed to be equivalent to conventional materials, because Mg present on the surface of a bearing is more readily oxidizable than Al in the matrix and, on the sliding surface, forms an MgO layer, which can improve non-adherence with respect to an opposite shaft.

(2) Under the annealing temper according to the present invention, although Mg and the impurities, that is, Sn, Bi, Pb, Si and the like, may be combined with one another and precipitate in the form of a compound, since the impurity elements are restricted at a low level, the solid solution state of Mg is essentially maintained even at high temperature. Cr and Zr precipitated during annealing enhance high-temperature strength. As a result, structural changes and hence strength reduction hardly occurs.

(3) Inventive plain bearings were subjected to a fatigue test using a bearing-component tester. The surface pressure, at which a crack generates on the inner surface of a bearing, was measured at constant cyclic number. The measured surface pressure of the inventive bearings was approximately 20 MPa higher than that of aluminum alloy of Patent Document 1. Thus, it was confirmed that the maximum operating temperature, at which the inventive plain bearings can be operated, is enhanced.

(4) The inventive aluminum alloy is free of soft component and hence its conformability is insufficient. An overlay coating layer serving as a countermeasure can improve conformability. Although the coating layer is baked, the artificial aging of the inventive aluminum-alloy sheet does not occur, because the temper of aluminum alloy is provided by annealing.

(5) Since a continuously cast thin sheet is cold rolled in the present invention, producers of plain bearings, who do not have a hot-rolling mill installed in their plant facilities, can easily produce rolled sheets. Aluminum alloy can be heat-treated so as to precipitate the transition elements such as Cr, Zr and the like, thereby adjusting its properties. The heat-treated aluminum alloy is then bonded to the backing metal. This process achieves cost reduction as compared with bonding of aluminum alloy to a backing metal, followed by solution treatment, to adjust properties of the aluminum alloy. An industrially produced roll-bonded sheer is usually wound to have a coil form. Therefore, a large-scale plant is necessary for solution treatment of large coils, which leads to cost increase. Temperature control of alloy is an important quality-controlling item in the solution treatment and may lead to increase production cost of solution treated large coils.

BEST MODE FOR CARRYING OUT INVENTION

EXAMPLE 1

Aluminum alloys, whose compositions are shown in Table 1, were continuously cast into sheets having a thickness of 15 mm. These sheets were cold rolled to a thickness of 6 mm. Low temperature heat treatment was carried out as shown in Table 1, followed by cold rolling to a thickness of 1 mm. High temperature heat treatment was carried out as shown in Table 1. The aluminum-alloy rolled sheets obtained by the above process were subjected to measurement of tensile strength at room temperature and 200 degrees C. The results are shown in Table 1. Table 1 shows the strength of a alloys having various components, as measured at room temperature and high temperature.

tate is not detected. FIG. 3 shows a mapping of the elements Al, Mg, Cr, Zr and Fe in the visual field of FIG. 2, whose elements detected in the visual field appear in white spots. Mg present in the alloy of the inventive Example No. 3 distribute uniformly, which indicates solid solution of Mg in the aluminum. In addition, Al concentration is higher than the Mg concentration. Al concentration is low at locations where Fe concentration is high, and where precipitation of Al—Fe based intermetallic compound is observed. When compared with precipitation of Al—Fe intermetallic compound, precipitation of Cr and Zr is different in the following points. These elements are detected when observed at a higher magnification mentioned above. They distribute uniformly in the form of minute spots and neither their mutual positional relationships nor their concentration relationships with the Al concentration are clear. Anyway, precipitation of Cr and Zr was observed. It is believed that Cr and Zr are dissolved in the form of solid solution of alloy during casting and then precipitate during the low-temperature or high-temperature annealing. The elements of the inventive Examples Nos. 1 through 11 distribute in a similar manner as the structure shown in FIG. 1.

(c) Structure of Comparative Example Free of Mg

Figure 4:
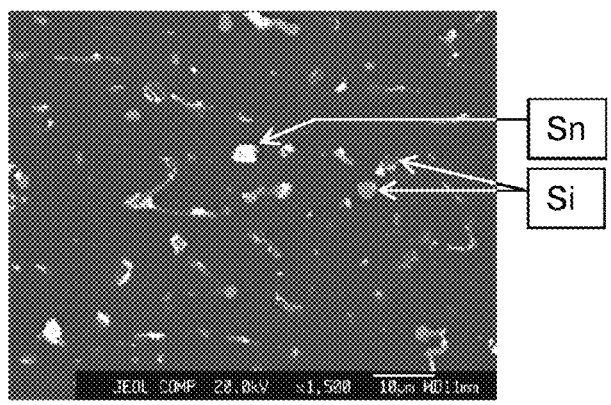
[FIG. 4] a microscopic photograph (magnification—1500 times) of aluminum alloy No. 12 of Table 1.
Figure 5:
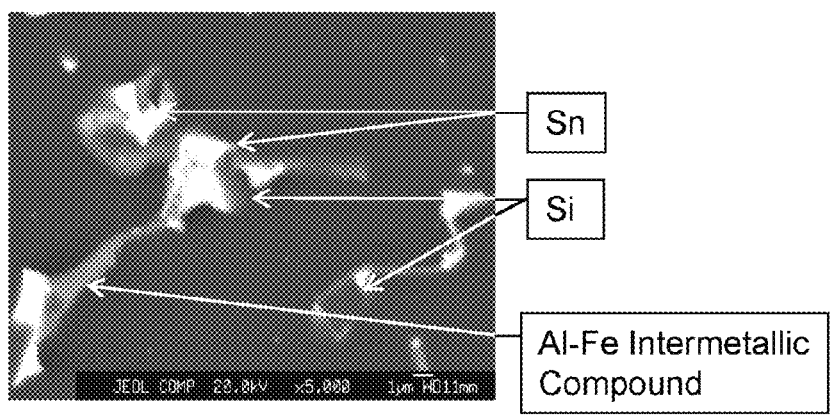
[FIG. 5] a microscopic photograph (magnification—5000 times) of aluminum alloy No. 3 of Table 1.
Figure 6:
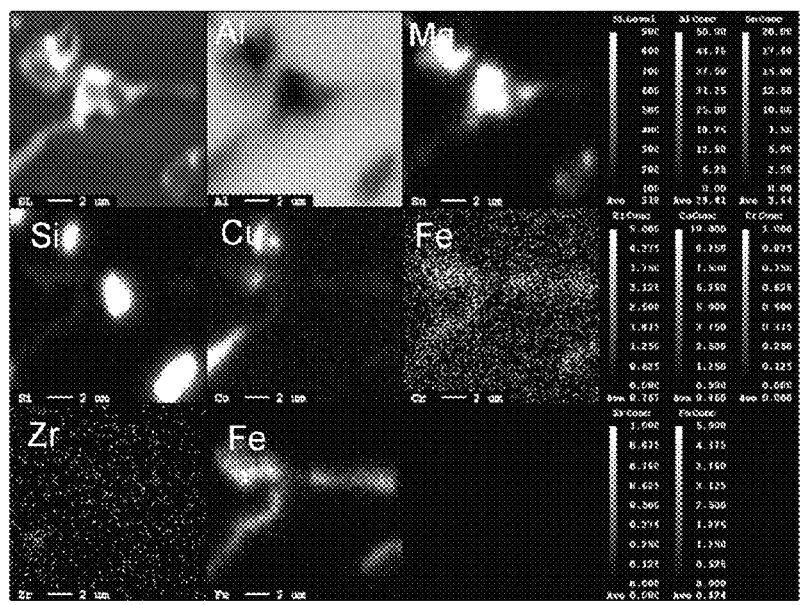
[FIG. 6] an element mapping by EPMA in the visual field of FIG. 5.

Microscopic photographs of Comparative Example No. 12 are shown in FIGS. 4 and 5. FIG. 6 is a mapping of the elements of this Comparative Example. Sn and Si of this alloy

TABLE 1

| Sample No. | Components of Bearing Alloy (mass %) | | | | | | | Low Temperature Heat Treatment (°C.) | High Temperature Heat TreatMent (°C.) | Tensile Strength (MPa) | |
|---|---|---|---|---|---|---|---|---|---|---|---|
| | Al | Mg | Cr | Zr | Cu | Sn | Si | | | Room Temperature | 200° C. |
| 1 | Bal | 3 | 0.2 | 0.15 | — | — | — | 350 | 420 | 250 | 155 |
| 2 | Bal | 3 | 0.1 | 0.1 | — | — | — | 360 | 450 | 240 | 140 |
| 3 | Bal | 3 | 0.2 | 0.2 | — | — | — | 350 | 410 | 255 | 163 |
| 4 | Bal | 3 | 0.15 | 0.1 | — | — | — | 350 | 420 | 215 | 148 |
| 5 | Bal | 5 | 0.2 | 0.15 | — | — | — | 350 | 420 | 320 | 195 |
| 6 | Bal | 5 | 0.1 | 0.15 | — | — | — | 350 | 420 | 310 | 180 |
| 7 | Bal | 5 | 0.15 | 0.1 | — | — | — | 350 | 450 | 310 | 180 |
| 8 | Bal | 7 | 0.1 | 0.1 | — | — | — | 350 | 450 | 340 | 230 |
| 9 | Bal | 7 | 0.1 | 0.15 | — | — | — | 350 | 420 | 340 | 135 |
| 10 | Bal | 7 | 0.2 | 0.1 | — | — | — | 350 | 410 | 330 | 130 |
| 11 | Bal | 3 | — | — | — | — | — | 350 | 420 | 230 | 110 |
| 12 | Bal | — | 0.2 | 0.1 | 1.5 | 4 | 2.5 | 350 | 420 | 190 | 105 |
| 13 | Bal | — | 0.15 | 0.15 | 1 | 12 | 2.5 | 350 | 450 | 170 | 100 |
| 14 | Bal | — | 0.25 | — | 0.1 | 6 | 2.5 | 350 | 420 | 130 | 75 |
| 15 | Bal | — | 0.1 | 0.1 | 1 | 10 | 2.5 | 350 | 450 | 145 | 95 |
| 16 | Bal | — | 0.2 | | 1 | 12 | 2.5 | 350 | 350 | 140 | 85 |
| 17 | Bal | 5 | 0.2 | 0.15 | — | 4 | — | 350 | 450 | 280 | 145 |

In the inventive examples of Table 1, Cu, Sn and Si are impurities. Their amounts are 0.1% or less, 0.2% or less and 0.5% or less, respectively. Relationships between the composition and properties revealed from Table 1 are described below. The structure of several alloys in Table 1 will also be described.

(a) Effects of Addition of Cr, Zr

Cr and Zr are added in the inventive Example No. 1, while Comparative Example 11 is free of Cr and Zr. From those different examples it was confirmed that addition of Cr and Zr lessens reduction in strength particularly at high temperature.

(b) Structure of Present Invention

Figure 1:
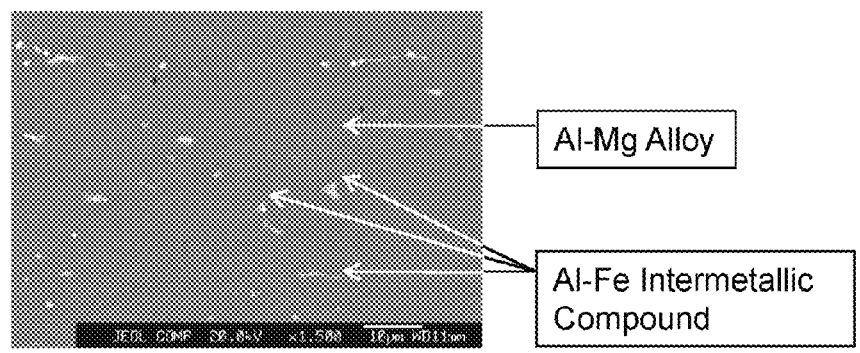
[FIG. 1] a microscopic photograph (magnification—1500 times) of aluminum alloy No. 3 of Table 1.
Figure 2:
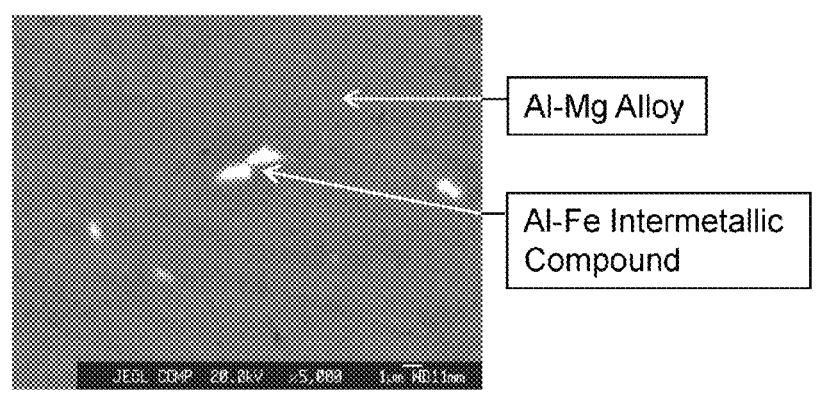
[FIG. 2] a microscopic photograph (magnification—5000 times) of aluminum alloy No. 3 of Table 1.
Figure 3:
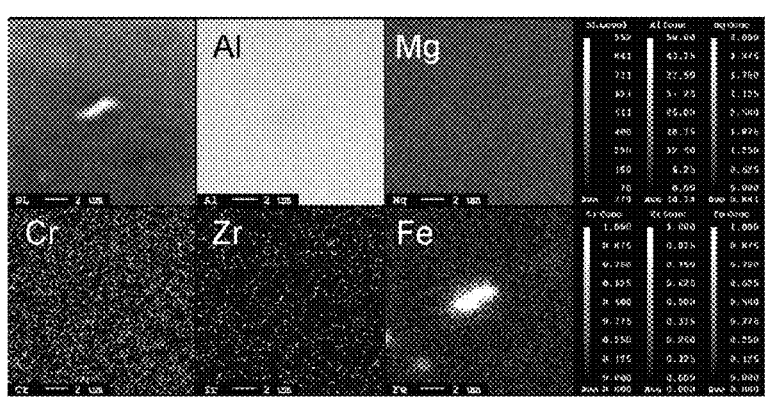
[FIG. 3] an element-mapping by EPMA in the visual field of FIG. 2.
Figure 7:
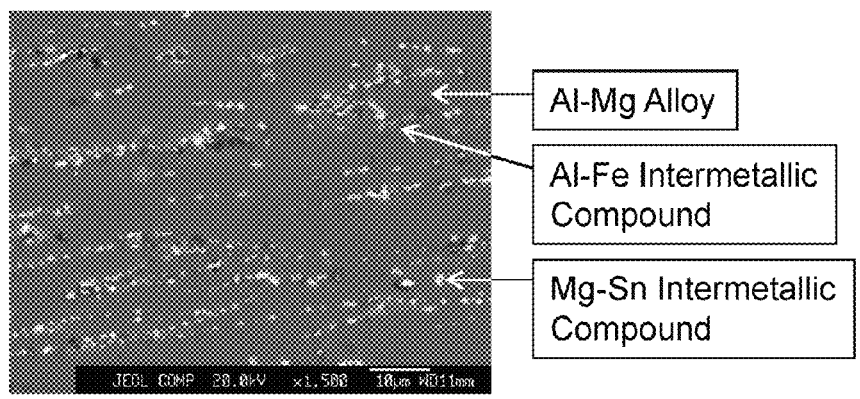
[FIG. 7] a microscopic photograph (magnification—1500 times) of aluminum alloy No. 17 of Table 1.
Figure 8:
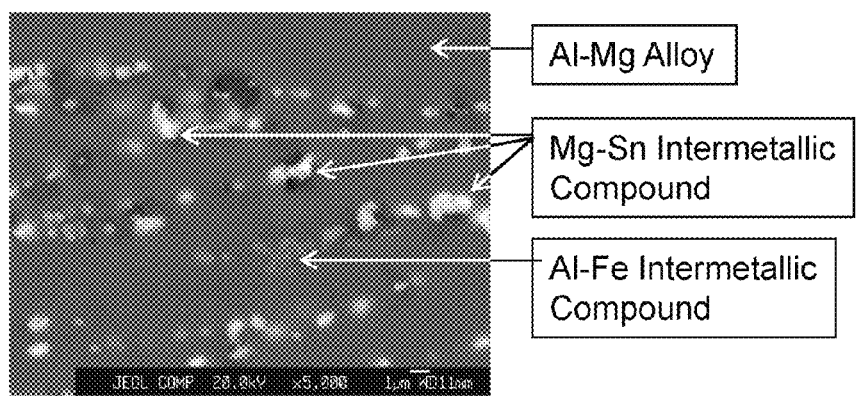
[FIG. 8] a microscopic photograph (magnification—5000 times) of aluminum alloy No. 17 of Table 1.

FIGS. 1 and 2 are microscopic photographs of the inventive Example No. 3. The portion indicated by a leader line "Al—Mg Alloy" has a composition shown in Table 1 and a precipiare virtually not dissolved in the solid solution of aluminum but precipitate or crystallize locally. Cu in the alloy is dissolved in its solid solution but partially precipitates in the form of an Al—Cu intermetallic compound. Specifically, Cu dissolved in super-saturation in the alloy partially precipitates during the post-rolling heat treatment in the form of an intermetallic compound. FIGS. 7 and 8 are microscope photographs of Comparative Example No. 17.

(d) Effect of Sn

Figure 9:
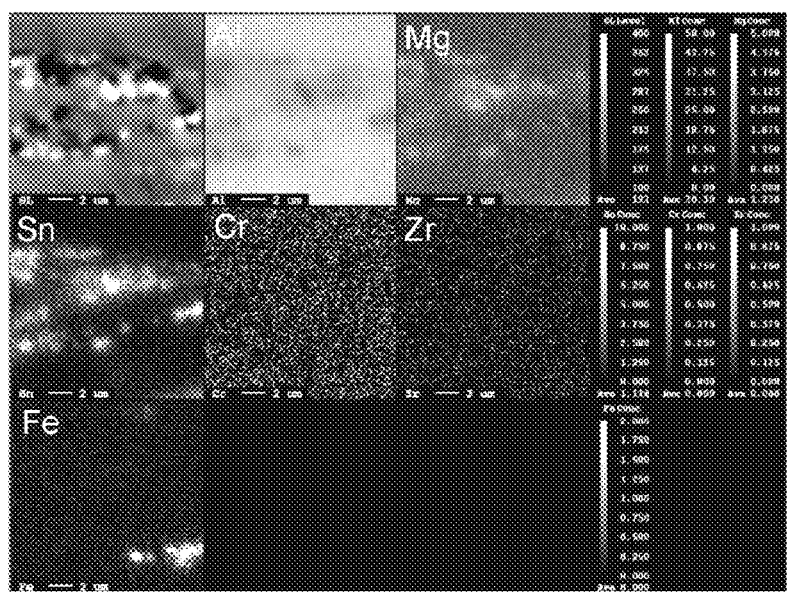
[FIG. 9] an element-mapping by EPMA in the visual field of FIG. 8

Comparative Examples Nos. 12 through 16 indicate that Sn added in a range of 4 to 12 mass % is not very effective for improving tensile strength at room temperature and high temperature. On the other hand, the tensile strength is high in Comparative Example No. 17, in which Mg and Sn form an intermetallic compound as shown in FIG. 9 of the element mapping.

EXAMPLE 2

Figure 10:
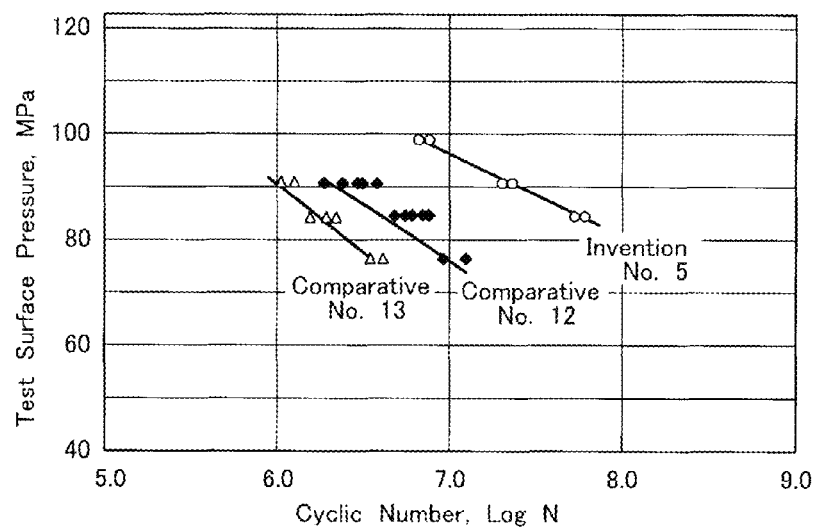
[FIG. 10] a graph showing the results of a fatigue test in Example 2.

An aluminum alloy having the composition of No. 5 in Table 1 was continuously cast, cold rolled, low-temperature heat-treated as shown in Table 1, further rolled, and then high-temperature heat treated as shown in Table 1, in the same manner as in Example 1. The thus-prepared aluminum-alloy sheet was bonded to a backing metal (2.6 mm thick SPCC) provide a bimetal (bearing material). For comparative examples, alloys having composition of Nos. 12 and 13 were also bonded to a backing metal. These bimetals were shaped into the form of a bearing and subjected to a fatigue test under the following conditions.
Test Conditions
Tester: cyclic dynamic load tester
Temperature of fed oil: 160 degrees C.
Test surface pressure: 78-100 MPa
Lubricating oil: SAE 10W-30
Material of shaft: high frequency quenched S55C As is apparent from the graph of FIG. 10, which shows the test results, the fatigue-generating surface pressure of the inventive Example 5 is higher than that of Comparative Examples Nos. 12, 13, by approximately 20 MPa.

EXAMPLE 3

Figure 11:
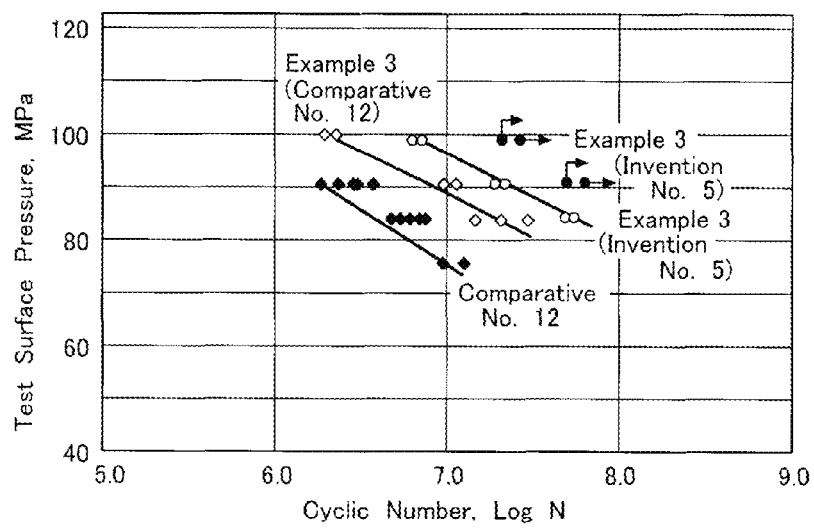
[FIG. 11] a graph showing the results of a fatigue test in Example 3.

The test material was the same as the product of inventive Example 2 and was surface-roughened by either pickling (for example, by use of a phosphate compound) or mechanically (for example, by shot-blasting or the like). $MoS_2$ and PAI (polyamide-imide) were blended to prepare a mixture, which was applied to the roughened surface followed by baking at 220 degrees C. The thus-prepared bearing with an overlay was subjected to a fatigue test under the same conditions as in Example 2. FIG. 11 ascertains improved fatigue resistance. When Comparative Example No. 12 is provided with an overlay, the overlay was effective for enhancing fatigue resistance. However, fatigue resistance of No. 5 without an overlay is more improved.

INDUSTRIAL APPLICABILITY

A plain bearing provided by the present invention is suitably used for a large-end bearing of a connecting rod and a main bearing of an internal combustion engine, a journal bearing of general industrial machines, and the like.

The invention claimed is:

1. An aluminum alloy for a plain bearing, characterized in that; it consists of an aluminum-alloy rolled sheet having a composition of 3 to 7 mass % Mg, 0.1 to 0.3 mass % Cr, and 0.1 to 0.3 mass % Zr, and 1.0 mass % or less in total of at least one element selected from the group consisting of Cu, Ni, Zn, Mn and V, with the balance being Al and inevitable impurities including less than 0.1 mass % of Pb, less than 0.3 mass % of Fe, less than 0.1 mass % of Sb, less than 0.3 mass % of Ti, 0.2 mass % or less of Sn, 0.5 mass % or less of Si and a trace amount of Bi and B; and further a principal structure of said aluminum alloy is an Al matrix containing solute Mg, minute particles of Cr, and minute particles of Zr.

2. A plain bearing, wherein an aluminum alloy for a plain-bearing according to claim 1 is bonded to a steel backing metal.

3. A plain bearing according to claim 2, wherein the steel backing metal consists of low carbon steel having 0.1 to 0.3 mass % of C.

4. A plain bearing according to claim 2, wherein a coating layer consisting of a solid lubricant $MoS_2$ and either or both of polyamide-imide and polyimide is applied, as an overlay, to the surface to be in contact with an opposite shaft.

5. A plain bearing according to claim 4, wherein said coating layer is a 2 to 10 μm thick overlay.

6. A plain bearing according to claim 4, wherein the $MoS_2$ content is 60 to 90 mass %.

7. An aluminum alloy for a plain bearing according to claim 1, characterized in that said aluminum-alloy rolled sheet has a annealing temper, namely, the aluminum-alloy rolled sheet is subjected to a low-temperature annealing at a temperature of not less than 300 degrees C. and less than 420 degrees C. and, after the low-temperature annealing, to a high-temperature annealing at not less than 420 degrees C. and not more than 450 degrees C., with a proviso that the temperature difference between the low-and high-temperature annealing treatments is 10 degrees C. or more.

8. An aluminum alloy for a plain bearing according to claim 7, wherein the Cr content is 0.1 to 0.2 mass % and the Zr content is 0.1 to 0.2 mass %.

9. A plain bearing, wherein an aluminum alloy for a plain-bearing according to claim 7 is bonded to a steel backing metal.

10. An aluminum alloy for a plain bearing according to claim 1, wherein the Cr content is 0.1 to 0.2 mass % and the Zr content is 0.1 to 0.2 mass %.

11. A plain bearing, wherein an aluminum alloy for a plain-bearing according to claim 10 is bonded to a steel backing metal.

12. A method for producing a plain bearing, characterized by continuously casting an aluminum alloy having a composition of 3 to 7 mass % Mg, 0.1 to 0.3 mass % Cr, 0.1 to 0.2 mass % Zr, and 1.0 mass % or less in total of at least one element selected from the group consisting of Cu, Ni, Zn, Mn and V, the balance being Al and inevitable impurities, including less than 0.1 mass % Pb, less than 0.3 mass % Fe, less than 0.1 mass % Sb, less than 0.3 mass % Ti, 0.2 mass % or less Sn, 0.5 mass % or less Si, and a trace amount of Bi and B, to thereby obtain a sheet having a thickness of 12 to 18 mm; cold-rolling the continuously cast sheet; and, during the rolling process to provide a final thickness of a plain bearing, the aluminum-alloy rolled sheet is successively subjected to a low-temperature annealing at a temperature of not less than 300 degrees C. and less than 420 degrees C. and to a high-temperature annealing at not less than 420 degrees C. to not more than 450 degrees C., with a proviso that the temperature difference between the low-and high-temperature annealing treatments is 10 degrees C. or more; and pressure-bonding the aluminum-alloy rolled sheet to steel backing metal;
wherein a principal structure of said aluminum alloy is an Al matrix containing solute Mg, minute particles of Cr, and minute particles of Zr.

13. A method for producing a plain bearing according to claim 12, characterized by applying to the surface to be in contact with an opposite shaft a coating consisting of a solid lubricant $MoS_2$ and either or both of polyamide-imide and polyimide as an overlay, and subsequently baking.

14. A method for producing a plain bearing according to claim 13, wherein said coating is a 2 to 10 μm thick overlay.

15. A method for producing a plain bearing according to claim 12, wherein the steel backing metal consists of low carbon steel having 0.1 to 0.3 mass % of C.

16. A method for producing a plain bearing according to claim 15, characterized by applying to the surface to be in contact with an opposite shaft a coating consisting of a solid lubricant $MoS_2$ and either or both of polyamide-imide and polyimide as an overlay, and subsequently baking.

* * * * *